(12) United States Patent
Yoshima et al.

(10) Patent No.: US 10,305,146 B2
(45) Date of Patent: May 28, 2019

(54) NON-AQUEOUS ELECTROLYTE BATTERY AND BATTERY PACK

(71) Applicant: Kabushiki Kaisha Toshiba, Minato-ku (JP)

(72) Inventors: Kazuomi Yoshima, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 33 days.

(21) Appl. No.: 15/420,387

(22) Filed: Jan. 31, 2017

(65) Prior Publication Data

US 2017/0141433 A1    May 18, 2017

Related U.S. Application Data

(63) Continuation of application No. PCT/JP2015/050795, filed on Jan. 14, 2015.

(51) Int. Cl.
*H01M 10/0583* (2010.01)
*H01M 10/0525* (2010.01)
(Continued)

(52) U.S. Cl.
CPC ......... *H01M 10/0583* (2013.01); *B60L 11/18* (2013.01); *H01M 4/13* (2013.01); *H01M 4/485* (2013.01); *H01M 4/5825* (2013.01); *H01M 4/661* (2013.01); *H01M 10/052* (2013.01); *H01M 10/0525* (2013.01);
(Continued)

(58) Field of Classification Search
CPC ......... H01M 10/0583; H01M 10/0525; H01M 4/485; H01M 4/5825; H01M 4/661; H01M 2004/029
See application file for complete search history.

(56) References Cited

U.S. PATENT DOCUMENTS

2009/0053592 A1*    2/2009  Mino .................... H01M 2/263
                                                                      429/161
2009/0081551 A1     3/2009  Hoshina et al.
(Continued)

FOREIGN PATENT DOCUMENTS

CN          2691069 Y       4/2005
CN          101167203 B     5/2010
(Continued)

OTHER PUBLICATIONS

T. Berger et al. "Lithium accumulator for high-power applications", Journal of Power sources 136, 2004, 3 pages.
(Continued)

*Primary Examiner* — Ula C Ruddock
*Assistant Examiner* — Matthew W Van Oudenaren
(74) *Attorney, Agent, or Firm* — Oblon, McClelland, Maier & Neustadt, L.L.P.

(57) ABSTRACT

A non-aqueous electrolyte battery includes a bipolar electrode and a non-aqueous electrolyte. The electrode includes positive-pole and negative-pole active material layers formed on both side surfaces of a current collector. The electrode is divided into plural parts each having a predetermined length in one direction, and is sequentially and alternately bent at every lines between the parts in opposite directions so that the parts are overlapped with each other.

16 Claims, 9 Drawing Sheets

(51) Int. Cl.
  H01M 4/66 (2006.01)
  H01M 4/58 (2010.01)
  H01M 4/485 (2010.01)
  H01M 10/052 (2010.01)
  B60L 11/18 (2006.01)
  H01M 4/13 (2010.01)
  *H01M 4/02* (2006.01)
  *H01M 2/34* (2006.01)
  *H01M 10/42* (2006.01)

(52) U.S. Cl.
  CPC ............ *H01M 2/34* (2013.01); *H01M 10/425* (2013.01); *H01M 2004/021* (2013.01); *H01M 2004/029* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2010/0190047 A1 | 7/2010 | West et al. |
| 2012/0021268 A1 | 1/2012 | Mailley et al. |
| 2012/0328921 A1 | 12/2012 | Kawaoka |
| 2014/0045040 A1* | 2/2014 | Chami ................ H01M 2/1646 429/160 |

FOREIGN PATENT DOCUMENTS

| | | |
|---|---|---|
| JP | 3-116661 | 5/1991 |
| JP | 6-140077 A | 5/1994 |
| JP | 08-138726 A | 5/1996 |
| JP | 2000-100471 | 4/2000 |
| JP | 2002-75455 | 3/2002 |
| JP | 2004-247209 A | 9/2004 |
| JP | 2012-516542 | 7/2012 |
| JP | 2012-521624 | 9/2012 |
| JP | 2013-41741 A | 2/2013 |
| JP | 2013-131463 | 7/2013 |
| JP | 2015-128019 A | 7/2015 |
| KR | 10-2007-0110563 A | 11/2007 |
| WO | WO 2011/111200 A1 | 9/2011 |
| WO | WO 2012/146589 A1 | 11/2012 |
| WO | WO2012146589 * | 11/2012 |

OTHER PUBLICATIONS

International Search Report dated Mar. 24, 2015 in PCT/JP2015/050795, filed on Jan. 14, 2015 ( with English Translation).
Written Opinion dated Mar. 24, 2015 in PCT/JP2015/050795, filed on Jan. 14, 2015.
V. Livshits et al. "Development of a bipolar Li/composite polymer electrolyte/pyrite battery for electric vehicles", Journal of Power Sources 97-98, 2001, 4 pages.
Office Action dated Apr. 4, 2017 in Japanese Patent Application No. 2016-510881.

* cited by examiner

NON-AQUEOUS ELECTROLYTE BATTERY AND BATTERY PACK

CROSS-REFERENCE TO RELATED APPLICATIONS

This is a Continuation Application of PCT Application No. PCT/JP2015/050795, filed Jan. 14, 2015, which was published under PCT Article 21(2) in Japanese and the entire contents of which are incorporated herein by reference.

FIELD

Embodiments described herein relate generally to a non-aqueous electrolyte battery and a battery pack.

BACKGROUND

As a high energy density battery, a non-aqueous electrolyte battery such as a lithium-ion secondary battery is under an extensive research and development in recent years. The non-aqueous electrolyte battery is expected to be a power source for a hybrid vehicle or an electric vehicle or an un-interruptible power source for a base station of mobile-phones. However, even if a cell of a lithium-ion secondary battery is made large, a voltage obtained from the cell is as low as about 3.7 V. For this reason, to obtain a high output, the cell must be made to be a large-scale to generate a large current. As a result of this, the whole of a device which uses the large-scaled cell becomes bulky.

As a battery to solve these problems, a bipolar battery has been proposed. The bipolar battery is a battery in which a plurality of bipolar electrodes, each having a current collector, a positive-pole active material layer formed on one side surface of the current collector and a negative-pole active material layer formed on the other side surface thereof, are laminated in series with electrolyte layers being interposed between them. Even if such a bipolar battery as described above is used as a cell, a high voltage can be obtained from the cell because the bipolar electrodes are laminated in series in the cell of the bipolar battery. Hence, a high output coming from a high voltage and constant current can be obtained from the bipolar battery. Further, since a high output can be obtained from a small number of the bipolar batteries, the number of the batteries which are needed to obtain the high output are decreased. Therefore, the number of battery connections can be largely decreased and an electrical resistance generated in the battery connections can be largely reduced.

The lithium-ion secondary battery employs a structure using a liquid electrolyte. However, in the cell of the bipolar battery, the positive-pole active material layer and the negative-pole active material layer are arranged repeatedly. Hence, the structure of the lithium-ion secondary battery using the liquid electrolyte is not able to be adapted simply to the bipolar battery. That is, the bipolar battery must be structured to independent and not to contact the liquid electrolytes between electrode layers from each other, so that a short circuit (liquid junction) by ionic conduction will not occur between them due to a contact between the liquid electrolytes that exist between the electrode layers.

A bipolar battery which uses a polymer solid electrolyte not containing a liquid electrolyte has been proposed. In this bipolar battery, a possibility of the short circuit (liquid junction) caused by the ionic conduction between the electrode layers becomes low. However, an ion conductance of the solid electrolyte is generally much lower than that of the liquid electrolyte and is about $\frac{1}{10}$ to $\frac{1}{100}$ of that of the liquid electrolyte. For this reason, the bipolar battery using the polymer solid electrolyte is not actually used.

Considering these circumstances, a bipolar battery using a gelled electrolyte that is a semi-solidified liquid electrolyte has been proposed. The gelled electrolyte is formed by impregnating a polymer such as polyethylene oxide (PEO) or polyvinylidene fluoride (PVdF) with a liquid electrolyte. The gelled electrolyte has a high ion conductance and is expected to make the bipolar battery generate a sufficient output density.

There is a problem to make a bipolar battery being large (have a high energy density). As a method of making the bipolar battery have a high energy density, for example, increasing area of each of positive-pole and negative-pole of the bipolar battery or connecting cells of bipolar batteries each having a small area in parallel. In a lithium-ion secondary battery having a conventional electrode structure, by tightly and spirally winding the electrodes of positive and negative poles together with separators and by installing them in a battery case at a high density, the conventional lithium-ion secondary battery is made to obtain a high energy density. In the bipolar battery, however, the positive-pole and the negative-pole are integrally formed. Hence, the opposite poles come into contact with each other by the spirally winding. For this reason, a short circuit occurs by the spirally winding, unless a separator or an insulating layer such as a polymer is placed between the bipolar electrode layers.

In this case, however, a thickness of an electrode body being inserted with the separator or the polymer increases, and an insulating efficiency of the electrode lowers. Therefore, it is difficult to make an energy density of the bipolar battery being high by the spirally winding the bipolar electrode in the past. Additionally, in a case in which the electrode area is increased by the spirally winding, it is difficult to set current collection tabs for connecting current collectors of the electrodes to a current terminal of the battery on the current collectors respectively. This means that the larger the area of each electrode is, the higher an internal resistance of the battery is. And, this prevents an output of the bipolar battery from increasing. Hence, a technique for solving these problems of the bipolar battery and for making the bipolar battery to have both a high output/input and a high energy density is required.

DETAILED DESCRIPTION

According to one embodiment, a non-aqueous electrolyte battery comprises a bipolar electrode and a non-aqueous electrolyte. The bipolar electrode includes a current collector, a positive-pole active material layer formed on one side surface of the current collector and a negative-pole active material layer formed on the other side surface of the current collector. The bipolar electrode is divided into a plurality of parts at every predetermined length along one direction and the bipolar electrode is sequentially and alternatively bent at every lines between the plural parts in opposite directions so that the plural parts are overlapped with each other.

According to one embodiment, a battery pack comprises non-aqueous electrolyte batteries each described above, and an outer member configured to store the non-aqueous electrolyte batteries.

Hereinafter, non-aqueous electrolyte batteries according to various embodiments and a battery pack according to a first embodiment will now be described with reference to accompanying drawings. Note that parts being common throughout the embodiments are denoted by the same reference numerals, and repetitive descriptions thereof will be omitted. The drawings are schematic views for explaining the embodiments and encouraging understanding of the embodiments. Shapes, dimensions, ratios and the like of the embodiments may be different from those in an actual device. Designs of the embodiments can appropriately be changed in consideration of the following explanations and known technologies.

First Embodiment

Figure 1:
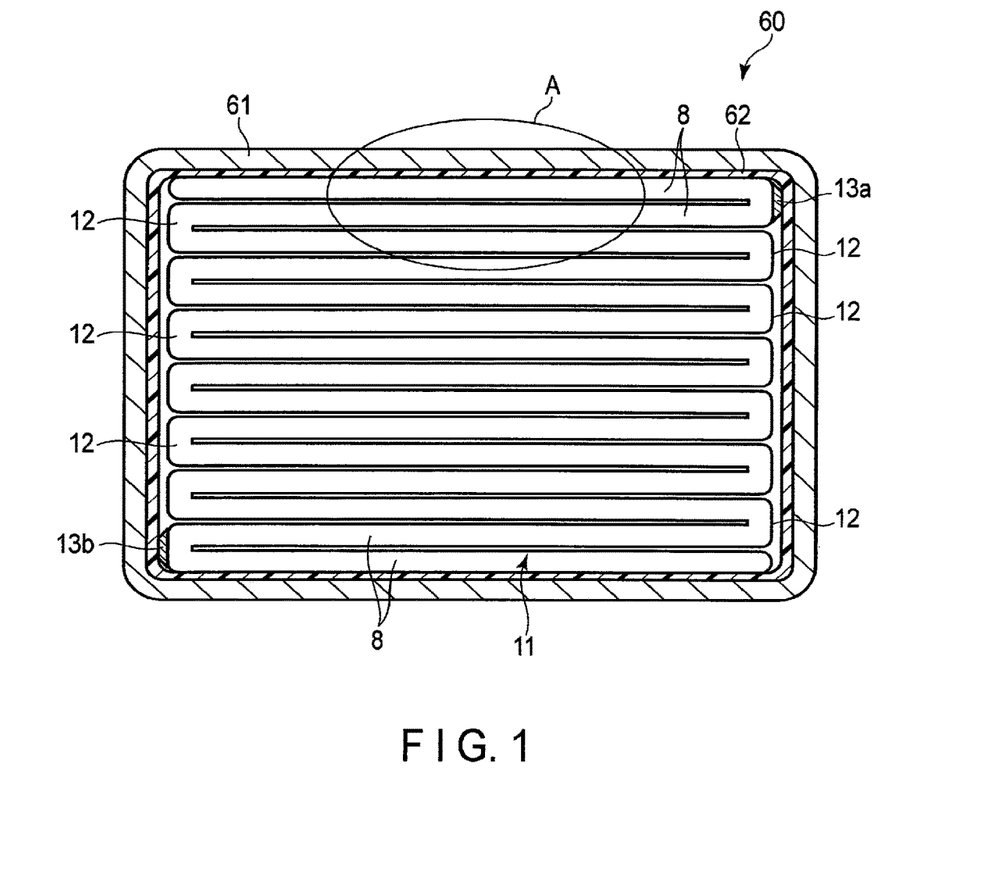
FIG. 1 is a cross sectional view schematically showing an arrangement of a non-aqueous electrolyte battery according to a first embodiment.
Figure 2:
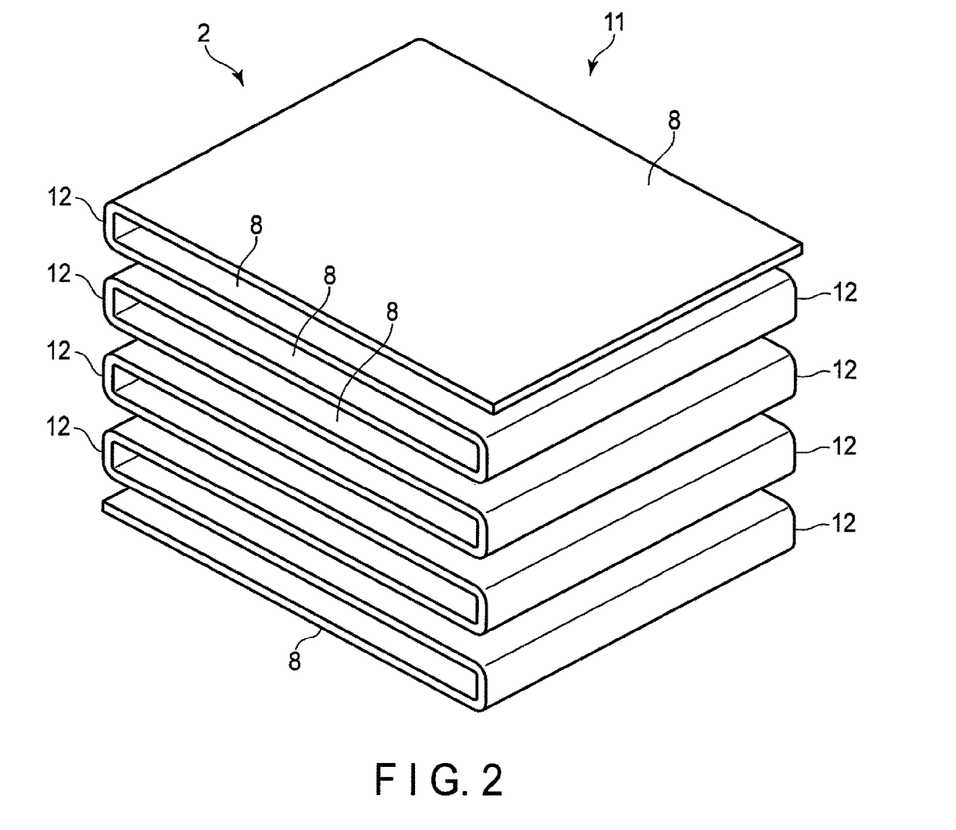
FIG. 2 is a perspective view schematically showing a structure of a bipolar electrode of the non-aqueous electrolyte battery according to the first embodiment.

FIGS. 1 to 7 show a first embodiment. FIG. 1 is a cross sectional view schematically showing a non-aqueous electrolyte battery 60 of one example according to a first embodiment. The non-aqueous electrolyte battery 60 shown in FIG. 1 includes an almost box-shaped outer member 61 and a zigzag-shaped bipolar electrode 11 stored in the outer member 61. The outer member 61 is formed from, for example, a laminated film in which a metal layer is interposed between two resin films. FIG. 2 is a perspective view schematically showing a structure of the bipolar electrode 11.

Example 1

Figure 3:
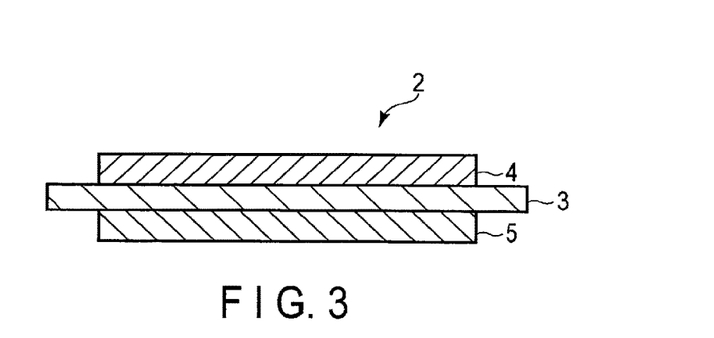
FIG. 3 is a longitudinal sectional view schematically showing a structure of a bipolar electrode of Example 1.

FIG. 3 shows a basic structure of an electrode body 2 of a bipolar electrode 1. As shown in FIG. 3, the electrode body 2 of the bipolar electrode 1 includes a current collector 3, a positive-pole active material layer 4 formed on one side surface of the current collector 3 and a negative-pole active material layer 5 formed on the other side surface of the current collector 3. As a raw material of the current collector 3, aluminum is used. And, the current collector 3 is shaped into a square having a side of, for example, 5 cm. For the positive-pole active material layer 4, lithium manganese phosphate (to be referred as LMP hereinafter) was used. For the negative-pole active material layer 5, lithium titanium oxide (to be referred as LTO hereinafter) was used. The positive-pole active material layer 4 can occlude and discharge lithium. A reaction potential of the negative-pole active material layer 5 exists near 1.5 V. LMP or LTO was mixed with an electrical conduction acceleration agent and a binder. In this example, 5 wt. % of carbon and 10 wt. % of polyvinylidene to the total weight of the electrode body 2 are mixed with LMP or LTO. The positive-pole active material layer 4 and negative-pole active material layer 5 of the bipolar electrode 1 according to Example 1 are formed by shaping these mixtures.

Example 2

Figure 4:
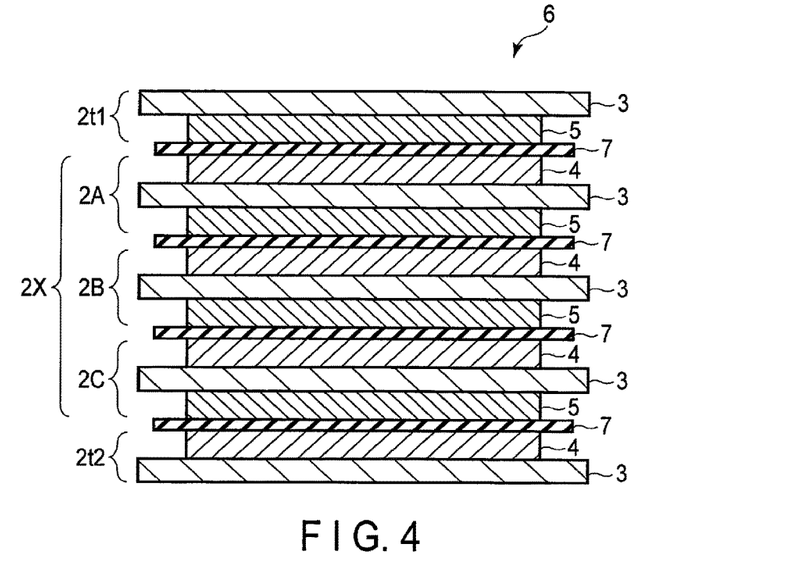
FIG. 4 is a longitudinal sectional view schematically showing a structure of a laminated-electrodes body of the bipolar electrode of Example 2.
Figure 5:
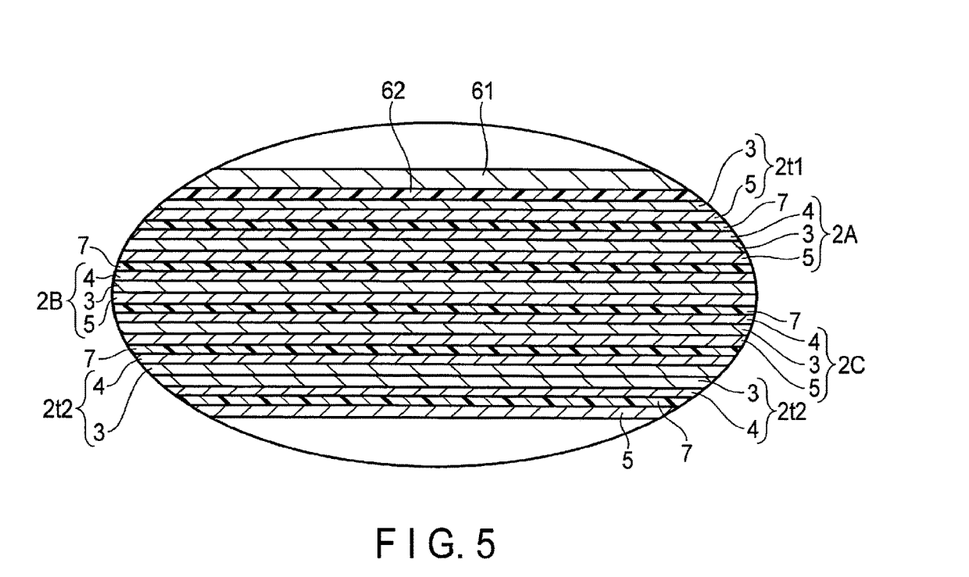
FIG. 5 is an enlarged sectional view of a portion A in FIG. 1.

As shown in FIG. 4, a laminated body 2X is formed by laminating three layers (electrode bodies 2A to 2C). Each of the electrode bodies 2A to 2C is prepared by using the electrode body 2 of the bipolar electrode 1 of Example 1. Electrolyte layers 7 exist between the electrode bodies 2A to 2C of the laminated body 2X and prevent the electrode bodies 2A to 2C from being in contact with each other. Further, as shown in FIG. 4, a negative pole member 2t1 is located in an upper side of the uppermost electrode body 2A and the negative pole member 2t1 is laminated on the uppermost electrode body 2A with the electrolyte layer 7 being interposed between them. As shown in FIG. 4, a positive pole member 2t2 is located in a lower side of the lowermost electrode body 2C and the positive pole member 2t2 is laminated on the lowermost electrode body 2C with the electrolyte layer 7 being interposed between them. Here, in the negative pole member 2t1, only the negative-pole active material layer 5 is formed on a lower side surface of the current collector 3. In the positive pole member 2t2, only the positive-pole active material layer 4 is formed on an upper side surface of the current collector 3. The laminated body 2X of these electrode bodies 2, the negative pole member 2t1 and the positive pole member 2t2 were integrally laminated and form a laminated-electrodes body 6, thereby preparing a bipolar battery according to Example 2.

Example 3

One side (long side) of the current collector 3 is set to, for example, 45 cm, and the other side (short side) of the current collector 3 is set to, for example, 5 cm. And, a bipolar electrode 1 of the Example 3 is prepared by the same procedure as in Example 1, excepting that the rectangular plate-shaped current collector 3 as described above is used. In this example, the positive-pole active material layer 4 is formed on one side surface of the rectangular plate-shaped current collector 3 to have a rectangular shape, and the negative-pole active material layer 5 is formed on the other side surface of the rectangular plate-shaped current collector 3 to have a rectangular shape.

Example 4

A laminated-electrodes body 6 of a rectangular plate-shape is formed by integrally laminating the laminated body 2X of the rectangular plate-shaped bipolar electrode 1 described in Example 3, the negative pole member 2t1 of a rectangular plate-shape, and a positive pole member 2t2 of a rectangular plate-shape, as in the same way of the laminated-electrodes body 6 of the example 2. In the laminated body 2X, three layers of the rectangular electrode bodies 2 (the rectangular electrode bodies 2A to 2C) are laminated with the electrolyte layers 7 being interposed between them. Further, the laminated-electrodes body 6 of the rectangular plate-shape is bent zigzag, thereby obtaining a zigzag bipolar electrode according to Example 4 which is like the zigzag bipolar electrode 11 (see FIG. 2). Herein, the laminated-electrodes body 6 is divided into a plurality of parts each having a predetermined length in one direction, and is sequentially and alternately bent at the lines between the divided parts 8 in the opposite directions in a zigzag pattern to overlap the divided parts 8 each other, as shown in FIG. 2. In this example, the laminated-electrodes body 6 is sequentially and alternately bent, for example, at every 5 cm in the opposite directions in the zigzag pattern, thereby forming a zigzag bipolar electrode according to Example 4 which is like the zigzag bipolar electrode 11 (see FIG. 2). Note that each of bent portions between the divided parts 8 is called as a bent portion 12.

Example 5 (Modification of First Embodiment)

Figure 8:
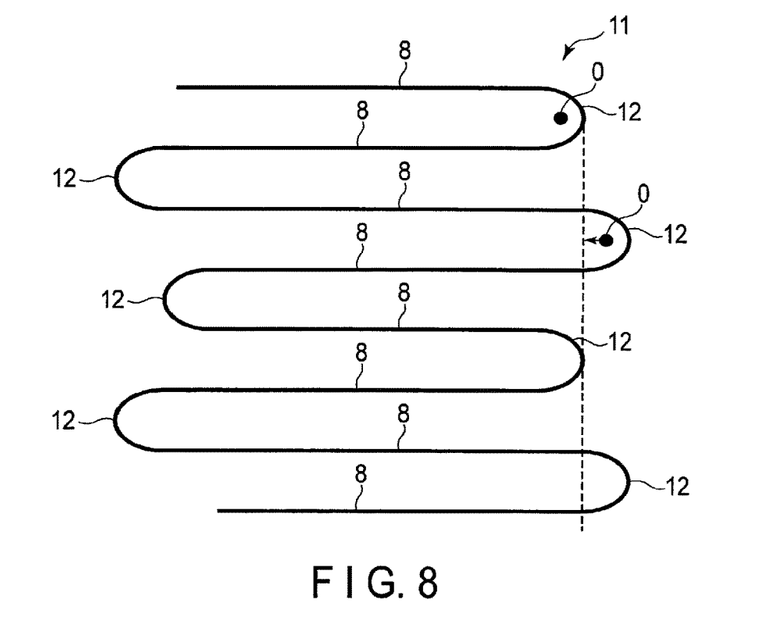
FIG. 8 is a side view schematically showing a main part of a modification of the non-aqueous electrolyte battery according to the first embodiment.
Figure 9:
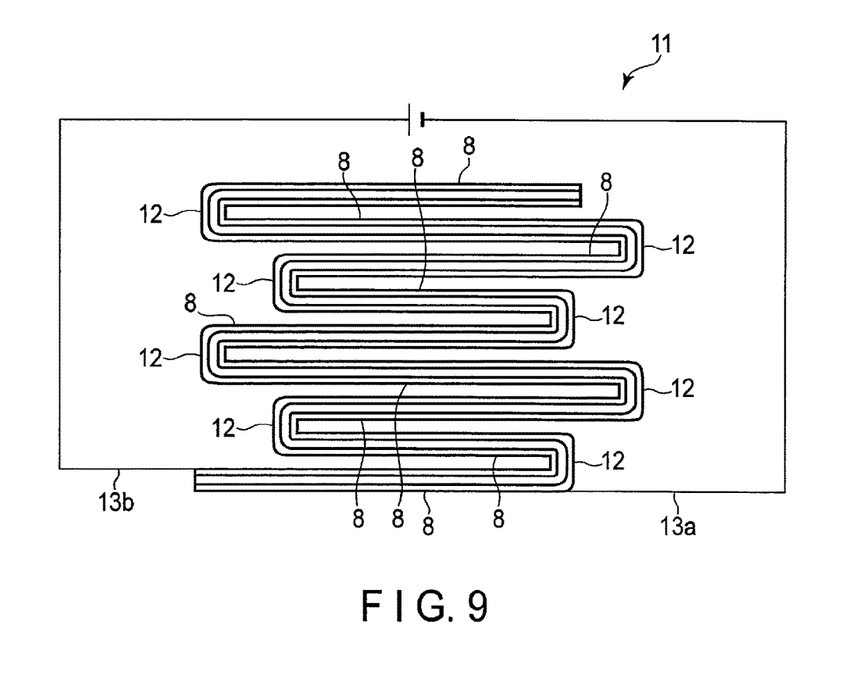
FIG. 9 is a view schematically showing a state of current collection tabs attached to the bipolar electrode in the non-aqueous electrolyte battery according to the first embodiment.

A zigzag-shaped bipolar electrode 11 of Example 5 is formed by the same procedure as that for the zigzag-shaped bipolar electrode 11 of Example 4 except that the laminated-electrodes body 6 is sequentially and alternately bent in a zigzag pattern while sequentially setting lengths of the divided parts 8 to 5 cm, 6 cm, 5 cm, 4 cm, 5 cm, 6 cm, 5 cm and 5 cm from a lower side of FIG. 8. As a result of this, a position "0" of a center of one bent portion 12 is shifted in a direction perpendicular to an overlap direction of the divided parts 8 from a position "0" of a center of the other bent portion 12 neighboring the one bent portion 12 in the overlap direction. And, as shown in FIG. 9, herein, one current collection tab 13a for a positive pole is formed on respective one bent portion 12 in one end side. One current collection tab 13b for a negative pole is provided on respective one bent portion 12 in the other end side.

Example 6

Figure 10:
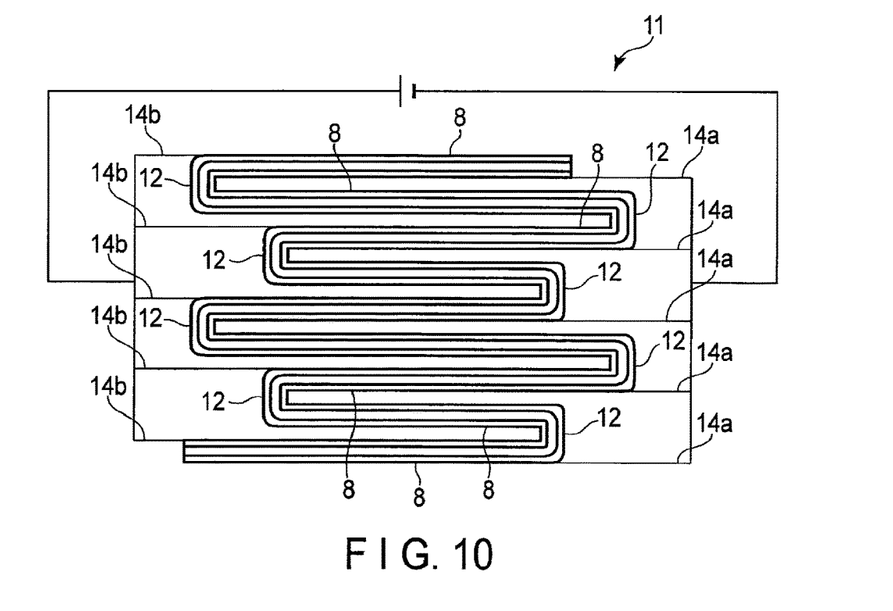
FIG. 10 is a view schematically showing a state of current collection tabs attached to a bipolar electrode in a non-aqueous electrolyte battery according to a modification of the first embodiment.

As shown in FIG. 10, the current collection tabs are set on five positive poles and on five negative poles at bending portions, that is, on ten positions in the total, by welding in the zigzag-shaped bipolar electrode 11 described in Example 5. In FIG. 10, 14a designates a current collection tab for a positive pole and 14b designates a current collection tab for a negative pole. Excepting these, the zigzag-shaped bipolar electrodes 11 is formed in the same way as that of Example 5.

As shown in FIG. 1, in the non-aqueous electrolyte battery 60 according to the first embodiment, the bipolar electrode 11 having the structure of Example 5 is stored in the outer member (case) 61. An insulating member 62 such as an unwoven fabric or a resin material is disposed on an inner surface of the outer member 61.

Near outer peripheral ends of the bipolar electrode 11, the current collection tab 13a for a positive pole is connected to the current collector 3 of the positive pole member 2t2 and the current collection tab 13b for a negative pole is connected to the current collector 3 of the negative pole member 2t1. The current collection tab 13b for a negative pole and the current collection tab 13a for a positive pole are extended to an outside through opening portions (not shown) of the outer member 61 and are connected to a negative-pole terminal 63 (see FIG. 6) and a positive-pole terminal 64 (see FIG. 6), respectively. The opening portions of the outer member 61 are heat-sealed with the current collection tab 13b for a negative pole and the current collection tab 13a for a positive pole being clamped in the opening portions, thereby completely hermetically sealing the bipolar electrode 11 and the non-aqueous electrolyte in the outer member 61.

Figure 6:
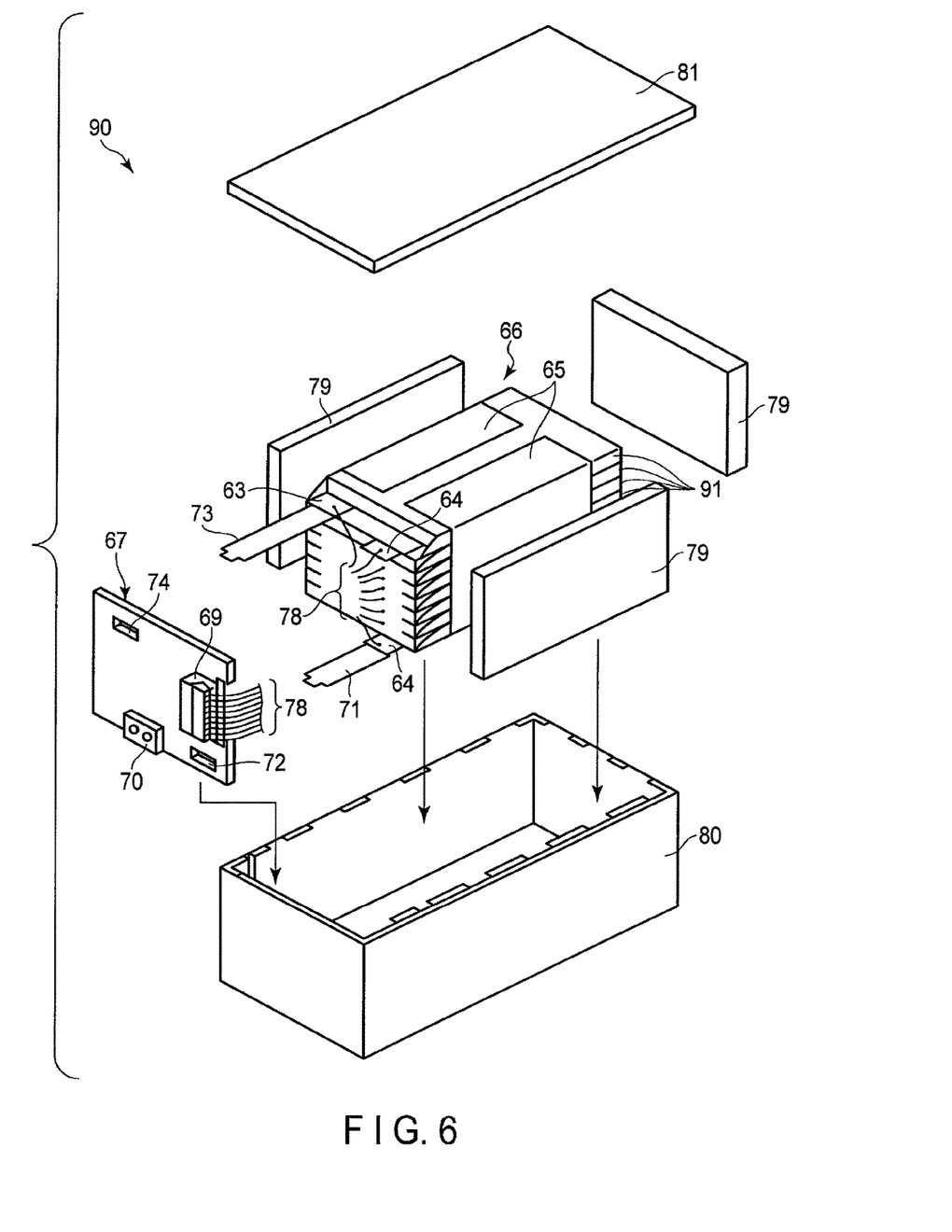
FIG. 6 is an exploded perspective view schematically showing a structure of a battery pack of non-aqueous electrolyte batteries each according to the first embodiment.
Figure 7:
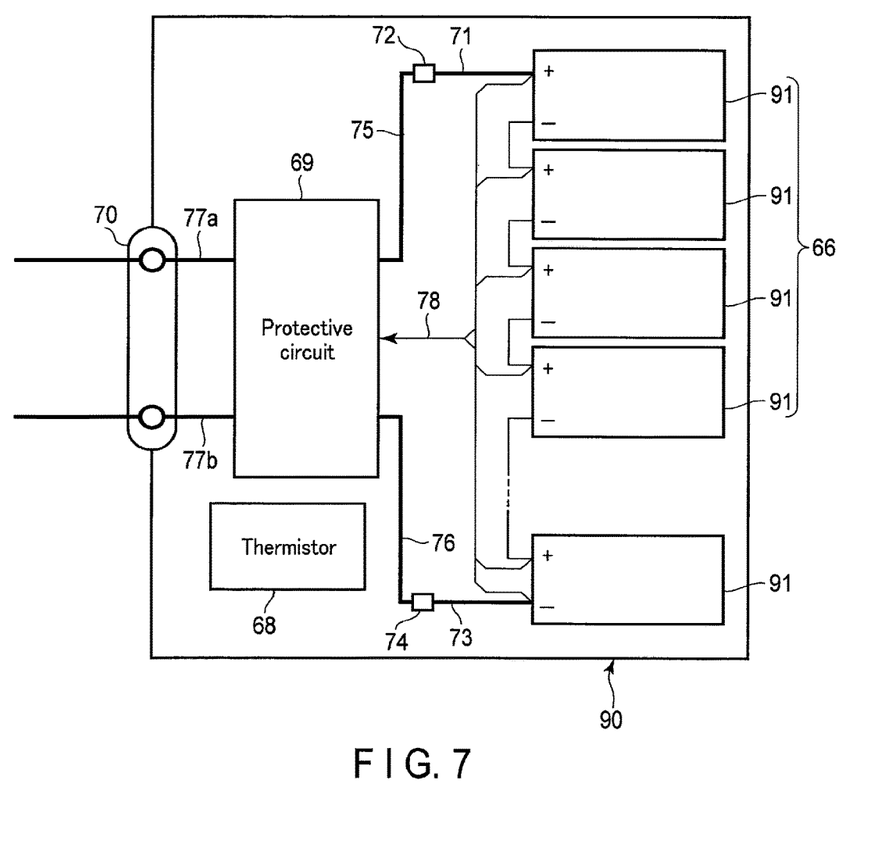
FIG. 7 is a block diagram schematically showing an electric circuit of the battery pack in FIG. 6.

FIG. 6 is an exploded perspective view schematically showing a structure of a battery pack 90 for the non-aqueous electrolyte battery 60 according to the first embodiment. FIG. 7 is a block diagram showing an electric circuit of the battery pack 90 shown in FIG. 6. The battery pack 90 shown in FIGS. 6 and 7 includes a plurality of cells 91. Each cell 91 is the non-aqueous electrolyte battery 60 described with reference to FIG. 1.

The plurality of cells 91 are laminated such that the negative-pole and positive-pole terminals 63 and 64 extended to the outside are aligned in the same direction, and fastened by an adhesive tape 65, thereby forming a battery set 66. These cells 91 are electrically connected in series with each other, as shown in FIG. 7.

A printed wiring board 67 is arranged to face side surfaces of the cells 91 from which the negative-pole and positive-pole terminals 63 and 64 extend. As shown in FIG. 7, a thermistor 68, a protection circuit 69 and terminals 70 for electrically connecting to an external device are mounted on the printed board 67. An insulating plate (not shown) is attached to a surface of the printed board 67 facing the battery set 66 to avoid unwanted electrical connections with wires of the battery set 66.

A positive-pole lead 71 is connected to the positive-pole terminal 64 located in the lowermost cell 91 of the battery set 66, and a distal end of the positive-pole lead 71 is inserted into a positive-pole connector 72 of the printed board 67 and is electrically connected thereto. A negative-pole lead 73 is connected to the negative-pole terminal 63 located in the uppermost cell 91 of the battery set 66, and a distal end of the negative-pole lead 73 is inserted into a negative-pole connector 74 of the printed board 67 and is electrically connected thereto. These connectors 72 and 74 are connected to the protection circuit 69 via wires 75 and 76 formed on the printed board 67.

The thermistor 68 detects temperatures of the cells 91 and transmits temperature detection signals to the protection circuit 69. The protection circuit 69 can disconnect plus-side and minus-side wires 77a and 77b between the protection circuit 69 and the terminal 70 for electrically connecting to an external device under predetermined conditions. One example of the predetermined conditions is, for example, a condition that the temperature detected by the thermistor 68 reaches a predetermined temperature or more. Another example of the predetermined conditions is, for example, a condition that an overcharge, an overdischarge, an overcurrent or the like of the cells 91 is detected. The detection of the overcharge or the like is done for each cell 91 or the whole battery set 66.

When performing the detection for each cell 91, a battery voltage may be detected, or a positive-pole potential or a negative-pole potential may be detected. In the latter case, a lithium electrode used as a reference pole is inserted into each cell 91. In the battery pack 90 shown in FIGS. 6 and 7, a wire 78 for a voltage detection is connected to each cell 91. Voltage detection signals are transmitted to the protection circuit 69 via the wires 78.

A protection sheet 79 made of rubber or a resin is arranged on each of three side surfaces of the battery set 66 except the side surface from which the negative-pole terminals 63 and the positive-pole terminals 64 project.

The battery set 66, together with the protection sheets 79 and the printed wiring board 67, is stored in a storage container 80. That is, the protection sheets 79 are arranged on both longitudinal inner surfaces of the storage container 80 extending in a longitudinal direction thereof and one of short inner surfaces of the storage container 80 extending in a lateral direction. The printed board 67 is arranged on the other of the short inner surfaces opposing to the one short inner surface. The battery set 66 is located in a space surrounded by the protection sheets 79 and printed wiring board 67. A lid 81 is attached to an upper opening of the storage container 80.

In order to fix the cells 91 of the battery set 66, a heat-shrinkable tape may be used in place of the adhesive tape 65. In this case, after the protection sheets 79 are arranged on the both longitudinal side surfaces of the battery set 66, and the heat-shrinkable tube is wound around the protection sheets 79 arranged on the both longitudinal side surfaces of the battery set 6. Then, the heat-shrinkable tube is shrunk by heat to bind the cells 91 of the battery set 66.

In FIGS. 6 and 7, the cells 91 are connected in series. However, to increase a battery capacity of the battery set 6, they may be connected in parallel. Assembled battery packs 90 may be connected in series and/or in parallel.

A form of the battery pack 90 is appropriately changed depending on its application purpose. The battery pack 90 is desirably used as one which demands a cycle characteristic with a large current characteristic. Concrete uses of the battery pack 90 are, for example, a power supply for a digital camera, an onboard power supply for a hybrid electric vehicle with two to four wheels, an electric vehicle with two to four wheels, an onboard power supply for an electrically assisted bicycle and the like. In particular, the battery pack 90 is most preferable to be used as the onboard power supply for various vehicles.

Next, the non-aqueous electrolyte battery 60 according to the first embodiment will be described in more detail. An electrode group of the bipolar electrode 11 of the non-aqueous electrolyte battery 60 can hold a non-aqueous electrolyte. The non-aqueous electrolyte, together with the electrode group, can also be stored in a main part of the outer member 61.

The non-aqueous electrolyte battery 60 according to the first embodiment can also prevent a leakage of the non-aqueous electrolyte through the opening portions through which the leads are passed, that is, a leakage of the non-aqueous electrolyte from the inside of the battery to an outside thereof. In particular, the non-aqueous electrolyte battery 60 according to the first embodiment achieves a high sealing property in the opening portions because the opening portions are heat-sealed with the leads being clamped therein. Therefore, the non-aqueous electrolyte battery 60 according to the first embodiment can more surely prevent the leakage of the non-aqueous electrolyte from the inside of the battery to the outside of thereof. The electrode group can include a positive pole and a negative pole. In addition, the electrode group can include a separator interposed between the positive pole and the negative pole.

A positive pole can include a positive-pole current collector and a positive-pole material layer formed on the positive-pole current collector. The positive pole material layer may be formed on each of both side surfaces or on only one side surface of the positive-pole current collector. The positive-pole current collector may include a positive-pole material layer non-carrying portion where the positive-pole material layer is not formed, on any of the both side surfaces or on each thereof.

The positive-pole material layer can contain a positive-pole active material. The positive-pole material layer can further contain an electrical conduction agent and a binding agent. The electrical conduction agent can be mixed in the positive-pole material layer to increase a current collection performance and to suppress a contact resistance between the positive-pole active material and the positive-pole current collector. The binding agent can be mixed in the positive-pole material layer to fill gaps in dispersed positive-pole active materials and to bind the positive-pole active material and the positive-pole current collector with each other.

The positive pole can be connected to an electrode lead, that is, a positive-pole lead, via, for example, the positive-pole material layer non-carrying portion of the positive-pole current collector. Connection between the positive pole and the positive-pole lead can be done by, for example, welding.

A negative pole can include a negative-pole current collector and a negative-pole material layer formed on the negative-pole current collector. The negative-pole material layer may be formed on each of both side surfaces or on only one side surface of the negative-pole current collector. The negative-pole current collector may include a negative-pole material layer non-carrying portion where the negative-pole material layer is not formed, on any of the both side surfaces or on each thereof.

The negative-pole material layer can contain a negative-pole active material. The negative-pole material layer can further contain an electrical conduction agent and a binding agent. The electrical conduction agent can be mixed in the negative-pole material layer to increase a current collection performance and to suppress a contact resistance between the negative-pole active material and the negative-pole current collector. The binding agent can be mixed in the negative-pole material layer to fill gaps in dispersed negative-pole active materials and to bind the negative-pole active material and the negative-pole current collector with each other.

The negative pole can be connected to an electrode lead, that is, a negative-pole lead, via, for example, the negative-pole material layer non-carrying portion of the negative-pole current collector. Connection between the negative pole and the negative-pole lead can be done by, for example, welding.

Members and materials which are usable in the non-aqueous electrolyte battery according to the first embodiment will be described below.

[1] Negative Pole

The negative pole can be formed, for example, by applying a negative-pole agent paste to one side surface or both side surfaces of a negative-pole current collector and then by drying it, the negative-pole agent paste being obtained, for example, by dispersing a negative-pole active material, an electrical conduction agent and a binding agent in an appropriate solvent. After the drying, the negative-pole agent paste can be pressed.

As the negative-pole active material, a carbonaceous material, metal oxide, metal sulfide, metal nitride, alloy, or light metal, each being capable of occluding and discharging lithium ions, can be used.

As the carbonaceous material which is capable of occluding and discharging lithium ions, coke, carbon fiber, pyrolytic vapor phase carbonaceous material, graphite, baked resin, baked product of mesophase pitch-based carbon fiber or mesophase spherical carbon or the like can be used. In particular, a mesophase pitch-based carbon fiber or mesophase spherical carbon, each being graphitized at 2,500° C. or more, is preferably used because it can increase an electrode capacity.

As the metal oxide, a metal composite oxide containing titanium, tin oxide such as $SnB_{0.4}P_{0.6}O_{3.1}$, $SnSiO_3$ or the like, silicon oxide such as SiO or the like, and tungsten oxide such as $WO_3$ or the like can be used. In these metal oxides, a negative-pole active material whose potential to metal lithium is higher than 0.5 V, for example, a metal composite oxide containing titanium such as lithium titanium oxide or the like is preferably used, because it can suppress a generation of lithium dendrite on the negative pole even if the battery is quickly charged, and thereby suppressing a degradation of the battery.

As the metal composite oxide containing titanium, a titanium oxide that does not contain lithium when synthesizing an oxide, lithium titanium oxide, lithium titanium composite oxide formed by substituting a part of constituent elements of lithium titanium oxide with at least one different element selected from a group consisting of, for example, Nb, Mo, W, P, V, Sn, Cu, Ni and Fe, or the like can be used. As the lithium titanium oxide, for example, lithium titanium oxide having a spinel structure (for example, $Li_{4+x}Ti_5O_{12}$ (x can change within a range of $0 \leq x \leq 3$ upon charging/discharging)), lithium titanium oxide having a bronze structure (B) or an anatase structure (for example, $Li_xTiO_2$ ($0 \leq x \leq 1$) a composition of which before charging is $TiO_2$), ramsdellite type lithium titanium oxide (for example, niobium titanium oxide (for example, $Li_xNbaTiO_7$ ($0 \leq x$, more preferably, $0 \leq x \leq 1$, $1 \leq a \leq 4$)) represented by $Li_{2+y}Ti_3O_7$ (y can change within a range of $0 \leq y \leq 3$ upon charging/discharging)) or the like ca be used.

As the titanium oxide, a metal composite oxide containing $TiO_2$, or Ti and at least one element selected from a group consisting of P, V, Sn, Cu, Ni, Co and Fe, or the like. $TiO_2$ is preferably of an anatase type which has a low crystallizability at an annealing temperature of 300° C. to 500° C. As the metal composite oxide containing Ti and at least one element selected from the group consisting of P, V, Sn, Cu, Ni, Co and Fe, for example, $TiO_2$—$P_2O_5$, $TiO_2$—$V_2O_5$, $TiO_2$—$P_2O_5$—$SnO_2$, $TiO_2$—$P_2O_5$-MeO (Me is at least one element selected from a group consisting of Cu, Ni, Co and Fe) and the like can be used. The metal composite oxide preferably has a microstructure in which a crystal phase and an amorphous phase coexist or an amorphous phase solely exists. With such a microstructure as described above, a cycle performance can largely improve. In particular, a metal composite oxide containing lithium titanium oxide and at least one element selected from the group consisting of P, V, Sn, Cu, Ni, Co and Fe is preferable.

As the metal sulfide, lithium sulfide ($TiS_2$), molybdenum sulfide ($MoS_2$), iron sulfide (FeS, $FeS_2$, $Li_xFeS_2$ ($0 < x \leq 1$) or the like can be used. As the metal nitride, lithium cobalt nitride ($Li_xCo_yN$ ($0 < x < 4$, $0 < y < 0.5$) or the like can be used.

As the negative-pole active material, lithium titanium oxide having a spinel structure is preferably used.

As the conduction agent, a carbon material can be used. As the carbon material, acetylene black, carbon black, coke, carbon fiber, graphite or the like can be used.

As the binding agent, for example, polytetrafluoroethylene (PTFE), polyvinylidene fluoride (PVdF), ethylene-propylene-diene copolymer (EPDM), styrene butadiene rubber (SBR), carboxymethylcellulose (CMC) or the like can be used.

As the negative-pole current collector, various metal foils can be used in accordance with a negative-pole potential. For example, aluminum foil, aluminum alloy foil, stainless steel foil, titanium foil, copper foil, nickel foil and the like can be used as the negative-pole current collector. A thickness of the foil for the negative-pole current collector preferably ranges from 8 μm or more to 25 μm or less. If the negative-pole potential can be higher than 0.3 V with respect to metal lithium, for example, if lithium titanium oxide is used as the negative-pole active material, aluminum foil or aluminum alloy foil is preferably used because it can suppress a battery weight.

An average crystal grain size of each of aluminum foil and aluminum alloy foil is preferably 50 μm or less. As a result of this, a strength of the negative-pole current collector can be dramatically increased. Therefore, a density of the negative-pole current collector can be increased under a high pressing pressure, and a battery capacity can be increased. In addition, since a dissolution and corrosion degradation of the negative-pole current collector in an overdischarge cycle under a hot environment (40° C. or more) can be prevented, an increase in a negative-pole impedance can be suppressed. Furthermore, an output characteristic, a quick charging and a charging/discharging cycle characteristic can also be improved. The average crystal grain size is more preferably 30 μm or less, and much more preferably 5 μm or less.

The average crystal grain size is obtained by the following way. A texture of the current collector surface is observed by an optical microscope, and the number "n" of crystal grains existing within a range of 1 mm×1 mm is obtained. Using "n", an average crystal grain area "S" is obtained by $S = 1 \times 10^{6/n}$ (μm$^2$). And, an average crystal grain size "d" (μm) can be calculated based on the obtained value "S" by a the following formula (A):

$$d = 2(S/\pi)^{1/2} \qquad (A)$$

In the aluminum foil or aluminum alloy foil with the average crystal grain size of 50 μm or less, since the average crystal grain size is complexly affected by many factors such as a material composition, impurity, process condition, heat treatment history, heating condition of annealing and the like, the crystal grain size (diameter) is adjusted by combining the above described factors in a manufacturing process for the foil.

A thickness of the aluminum foil or aluminum alloy foil is preferably 20 μm or less, and more preferably 15 μm or less. A purity of the aluminum foil is preferably 99% or more. The aluminum alloy foil preferably contains at least one element such as magnesium, zinc, silicon or the like. On the other hand, a content of a transition metal such as iron, copper, nickel, chromium and the like is preferably 1% or less. Note that, for an onboard battery, aluminum alloy foil is particularly preferably used.

As a compound ratio of the active material, the conduction agent and the binding agent in the negative pole, 80 to 95 wt. % of the negative-pole active material, 3 to 20 wt. % of the conduction agent and 1.5 to 7 wt. % of the binding agent are preferable.

[2] Positive Pole

The positive pole can be formed, for example, by applying a positive-pole agent paste to one side surface or both side surfaces of a positive-pole current collector and then by drying it, the positive-pole agent paste being obtained, for example, by dispersing a positive-pole active material, a conduction agent and a binding agent in an appropriate solvent.

As the positive-pole active material, various oxides, sulfides and the like can be used. Examples of the positive-pole active material are manganese dioxide ($MnO_2$), iron oxide, copper oxide, nickel oxide, lithium manganese composite oxide (for example, $Li_xMn_2O_4$ or $Li_xMnO_2$ ($0 \leq x \leq 1.2$)), lithium nickel composite oxide (for example, $Li_xNiO_2$ ($0 \leq x \leq 1.2$)), lithium cobalt composite oxide ($Li_xCoO_2$ ($0 \leq x \leq 1.2$)), lithium nickel cobalt composite oxide (for example, $LiNi_{1-y}Co_yO_2$ ($0 < y \leq 1$)), lithium manganese cobalt composite oxide (for example, $LiMn_yCo_{1-y}O_2$ ($0 < y \leq 1$)), spinel-type lithium manganese nickel composite oxide ($Li_xMn_{2-y}Ni_yO_4$ ($0 \leq x \leq 1.2$, and $0 < y \leq 1$)), lithium phosphorus oxide having an olivine structure ($Li_xFePO_4$, $Li_xFe_{1-y}Mn_yPO_4$, $Li_xMnPO_4$, $Li_xMn_{1-y}Fe_yPO_4$, $Li_xCoPO_4$ or the like ($0 \leq x \leq 1.2$, and $0 < y \leq 1$)), iron sulfate ($Fe_2(SO_4)_3$), vanadium oxide (for example, $V_2O_5$) and the like.

As the positive-pole active material, organic materials and inorganic materials, for example, conductive polymer materials such as polyaniline and polypyrrole, a disulfide-based polymer material, sulfur (S), fluorocarbon and the like, can be used.

More preferable positive-pole active materials are spinel type manganese lithium a heat stability of which is high ($Li_xMn_2O_4$ ($0 \leq x \leq 1.1$)), olivine type lithium iron phosphate ($Li_xFePO_4$ ($0 \leq x \leq 1$)), olivine type lithium manganese phosphate ($Li_xMnPO_4$ ($0 \leq x \leq 1$)), olivine type lithium manganese iron phosphate ($Li_xMn_{1-y}Fe_yPO_4$ ($0 \leq x \leq 1$, and $0 < y \leq 0.5$)) and the like.

Alternatively, a mixture of two or more of these materials is usable.

As the conduction agent, for example, acetylene black, carbon black, artificial graphite, natural graphite, conductive polymer or the like is usable.

As the binding agent, for example, polytetrafluoroethylene (PTFE), polyvinylidene fluoride (PVdF), modified PVdF obtained by substituting at least one of hydrogen and fluorine of PVdF with another substituent, copolymer of vinylidene fluoride and propylene hexafluoride, terpolymer of polyvinylidene fluoride, tetrafluoroethylene and propylene hexafluoride, or the like is usable.

As an organic solvent for dispersing the binding agent, N-methyl-2-pyrrolidone (NMP), dimethylformamide (DMF) or the like is used.

As the positive-pole current collector, for example, aluminum foil, aluminum alloy foil, stainless steel foil, titanium foil or the like, each having a thickness of 8 to 25 μm, can be used.

Aluminum foil or aluminum alloy foil is preferably used as the positive-pole current collector. Like the negative-pole current collector, an average crystal grain size of the aluminum foil or aluminum alloy foil for the positive-pole current collector is preferably 50 μm or less. The average crystal grain size of the aluminum foil or aluminum alloy foil is more preferably 30 μm or less, and much more preferably 5 μm or less. If the average crystal grain size is 50 μm or less, the strength of the aluminum foil or aluminum alloy foil can dramatically be increased. As a result of this, a density of the positive pole can be increased under a high pressing pressure, and the battery capacity can be increased.

In aluminum foil or aluminum alloy foil with the average crystal grain size of 50 μm or less, its average crystal grain size is complexly affected by many factors such as a material texture, impurity, process condition, history of heat treatment, annealing condition and the like. Therefore, the crystal grain size is adjusted by combining the factors in a manufacturing process of the foil.

A thickness of the aluminum foil or aluminum alloy foil is preferably 20 μm or less, and more preferably 15 μm or less. A purity of the aluminum foil is preferably 99% or more. The aluminum alloy foil preferably contains an element such as magnesium, zinc or silicon. On the other hand, a content of a transition metal such as iron, copper, nickel, chromium or the like is preferably 1% or less.

As for a compound ratio of the active material, the conduction agent and the binding agent in the positive pole, 80 to 95 wt. % of the positive-pole active material, 3 to 20 wt. % of the conduction agent and 1.5 to 7 wt. % of the binding agent are preferable.

[3] Separator

As the separator, for example, a porous separator can be used. A material of the porous separator may be, for example, a porous film containing polyethylene, polypropylene, cellulose or polyvinylidene fluoride (PVdF), an unwoven fabric made of a synthetic resin or the like. In particular, a porous film made of polyethylene or polypropylene or both of them is preferable, because it can add a shutdown function by which pores are closed and a charging/discharging current is largely attenuated in case of an increase in a battery temperature so that a safety of the secondary battery is improved. From a viewpoint of cost reduction, a cellulose-based separator is preferably used.

[4] Non-Aqueous Electrolyte

As the non-aqueous electrolyte, an organic electrolytic solution can be used. And, the organic electrolytic solution is obtained by dissolving at least one lithium salt selected from a group consisting of $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, $LiB[(OCO)_2]_2$ and the like in an organic solvent at a concentration ranging from 0.5 to 2 mol./L.

As the organic solvent, it is preferable to use solely a solvent containing a cyclic carbonate such as propylene carbonate (PC), ethylene carbonate (EC) or the like, a chain carbonate such as diethyl carbonate (DEC), dimethyl carbonate (DMC), methyl ethyl carbonate (MEC) or the like, a chain ether such as dimethoxyethane (DME), diethoxyethane (DEE) or the like, a cyclic ether such as tetrahydrofuran (THF), dioxolane (DOX) or the like, γ-butyrolactone (GBL), acetonitrile (AN), sulfolan (SL) or the like, and a mixture thereof may also be preferably used.

Further, as the non-aqueous electrolyte, a cold molten salt (ionic melt) containing lithium ions can also be used. If an ionic melt that contains lithium ions, organic cation and anion and that maintains a liquid state even at 100° C. or less, or preferably at a room temperature or less is selected, a secondary battery having a wide operating temperature can be obtained.

[5] Case

A thickness of a stainless steel member usable as the case is preferably 0.2 mm or less. For example, the stainless steel member can be formed from a composite film material obtained by laminating a metal foil made of stainless steel and an organic resin film having a rigidity in this order on a heat fusible resin film (thermoplastic resin film) located as the innermost layer.

As the heat fusible resin film, for example, a polyethylene (PE) film, a polypropylene (PP) film, a polypropylene-polyethylene copolymer film, an ionomer film, an ethylene-vinyl acetate (EVA) film or the like can be used. And, as the organic resin film having a rigidity, for example, a polyethylene terephthalate (PET) film, a nylon film or the like can be used.

The case may comprise a case body including a concave portion capable of serving as a main part to store the electrode group and an outer housing portion surrounding the concave portion, and a lid. In this case, the case body and the lid may be seamlessly continued to form an integrated member.

[6] Electrode Lead

As a material of the electrode lead which can be electrically connected to the positive pole, that is, a material of the positive-pole lead, for example, aluminum, titanium, an alloy based on them, stainless steel or the like can be used.

As a material of the electrode lead which can be electrically connected to the negative pole, that is, a material of the negative-pole lead, for example, nickel, copper, an alloy based on them or the like can be used. If a potential of the negative pole is higher than 1 V with respect to that of metal lithium, for example, aluminum or an aluminum alloy can be used as the materiel of the negative-pole lead while lithium titanium oxide is used as the negative-pole active material. In this case, aluminum or an aluminum alloy is preferably used for both of the positive-pole lead and the negative-pole lead because an weight of each of the positive-pole lead and the negative-pole lead can be lightened and an electrical resistance thereof can be suppressed low.

From a viewpoint of a mechanical characteristic, a strength of each of the positive-pole lead and the negative-pole lead is preferably not so much higher than a strength of each of the positive-pole current collector and the negative-pole current collector to which each of the positive-pole lead and the negative-pole lead is respectively connected, because a stress concentration generated in their connecting portions are reduced. When an ultrasonic welding as one of preferable connecting methods for the current collectors is used, the welding can easily and firmly be performed if the Young's modulus of each of the positive-pole and negative-pole leads is small.

For example, pure aluminum (JIS 1000s) that has been annealed is preferable as the material of the positive-pole lead or negative-pole lead.

A thickness of the positive-pole lead is preferably 0.1 to 1 mm, and more preferably, 0.2 to 0.5 mm.

A thickness of the negative-pole lead is preferably 0.1 to 1 mm, and more preferably, 0.2 to 0.5 mm.

In the non-aqueous electrolyte battery 60 according to the first embodiment with the above-described arrangement, the zigzag-shaped bipolar electrode 11 is stored in the outer member 61. In this embodiment, three electrode bodies 2 of the bipolar electrodes 1 are used and laminated to form the laminated body 2X of three layers (electrode bodies 2A to 2C) of the electrode bodies 2. And, the laminated body 2X of the electrode bodies 2, the negative-pole member 2t1 and the positive-pole member 2t2 are integrally laminated to form the laminated-electrodes body 6. Further, the laminated-electrodes body 6 as one plate is divided into a plurality of parts each having a predetermined length in one direction, and is sequentially and alternatively bent at lines between the divided parts 8 are sequentially and alternately bent in a zigzag pattern to overlap the divided parts 8 with each other, thereby forming the zigzag-shaped bipolar electrode 11 as shown in FIGS. 1 and 2. Since the bipolar electrode 11 is bent in the zigzag-pattern, the energy density of the battery 60 can be improved while its volume is small.

First Modification of First Embodiment

FIG. 8 shows a first modification of the non-aqueous electrolyte battery 60 according to the first embodiment. In this modification, as has been described in the item [Example 5], the bipolar electrode 11 is bent in the zigzag-shaped pattern such that the position "O" of the center point of one bent portion 12 is shifted in the direction perpendicular to the direction in which the divided parts 8 are overlapped with each other from that of the other bent portion 12 neighboring the one bent portion 12 in the overlapped direction.

In this modification, a shift in a longitudinal direction of the bipolar electrode 11 generated between an layer of the electrode body 2 located in an inner side of one bending portion 12 a layer of the electrode body 2 located in an outer side of the bending portion 12 of the other bending portion 12 nest to the one bending portion 12 can be canceled and adsorbed. Therefore, even if the bent portions 12 of plural stages are provided, internal stresses generated between the electrode bodies 2 of the electrodes laminated body 6 can be reduced.

Second Modification of First Embodiment

Figure 11:
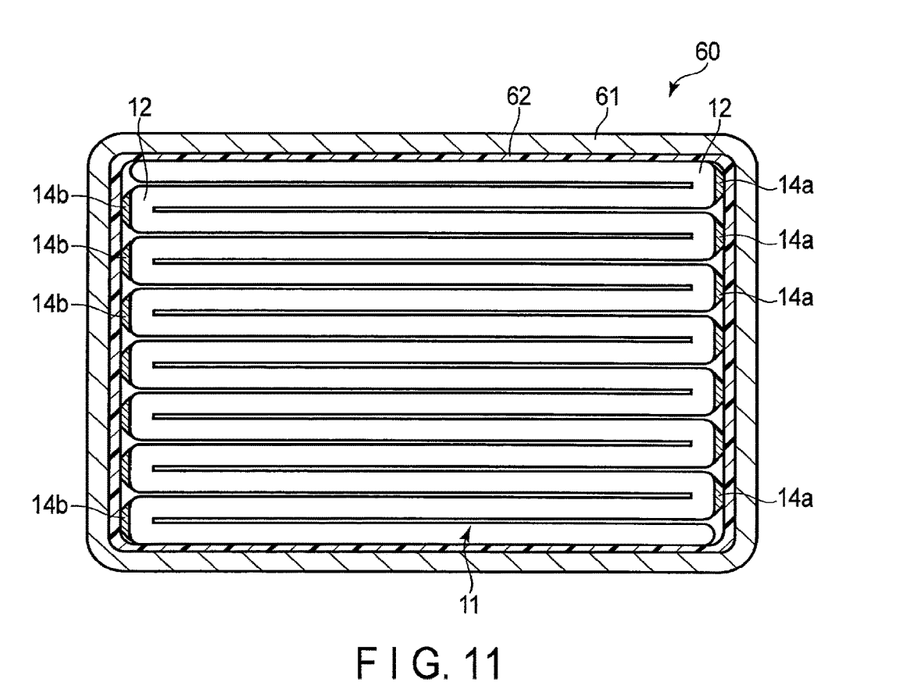
FIG. 11 is a cross sectional view schematically showing a structure of the non-aqueous electrolyte battery according to the modification of the first embodiment and employing the attached state of the current collection tabs shown in FIG. 10.

FIGS. 10 and 11 show a second modification of the non-aqueous electrolyte battery 60 according to the first embodiment. In this modification, when bending the bipolar electrode 11 in the zigzag pattern as shown in FIG. 10, the current collection tabs (the current collection tabs 14a for a positive pole and the current collection tabs 14b for a negative pole) are attached to the bent portions 12.

Figure 12:
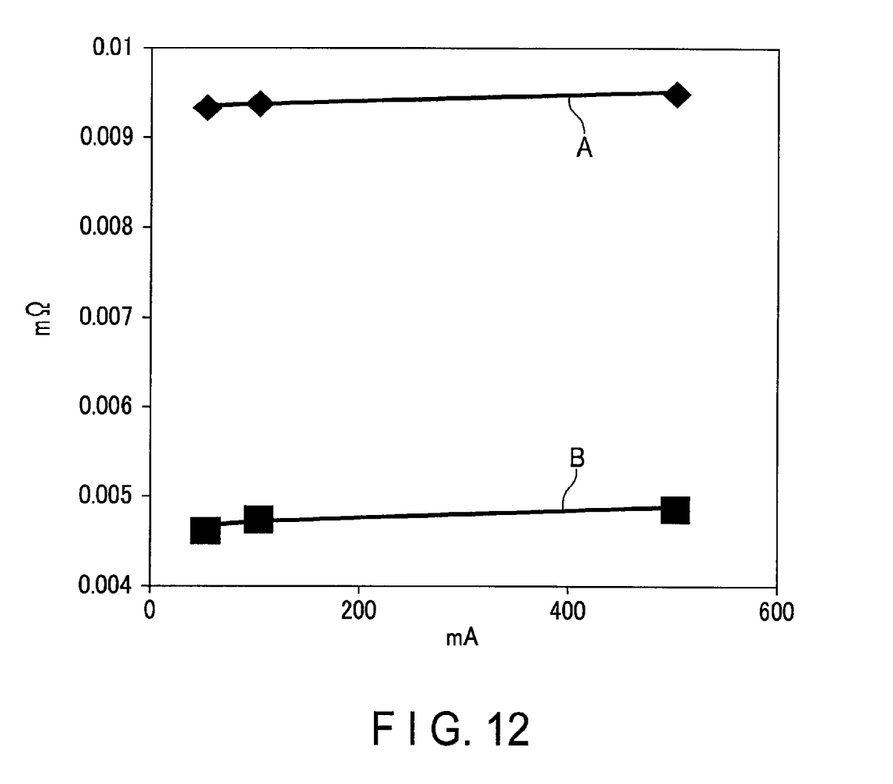
FIG. 12 is a view showing results of resistance test for the current collector in each of the bipolar electrodes shown FIGS. 9 and 10 and employed in the non-aqueous electrolyte batteries according to the first embodiment and its modification.

In this modification, additionally, a current collection efficiency is raised so that a high output can be expected. The current collection efficiencies of the bipolar batteries according to Example 5 (see FIG. 9) and Example 6 (see FIG. 10) were measured. In the measurement, resistance values obtained when currents of 50 mA, 100 mA and 500 mA were supplied were read. FIG. 12 shows results of this measurement. In FIG. 12, a measured value A represents a measurement result obtained when the current collection tab is provided at one portion, and a measured value B represents a measurement result obtained when the current collection tabs are provided at five portions. As is apparent from FIG. 12, when the number of current collection tabs is increased to 5, the resistance is reduced to about ½ as compared to the case in which the current collection tab is provided at one portion.

Comparative Example 1

Figure 13A:
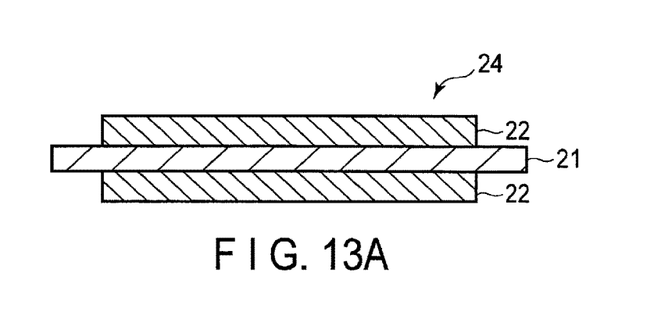
FIG. 13A is a longitudinal sectional view schematically showing a structure of a bipolar electrode used in a comparative Example 1, in which positive-pole active material layers are formed on both side surfaces of a current collector.
Figure 13B:
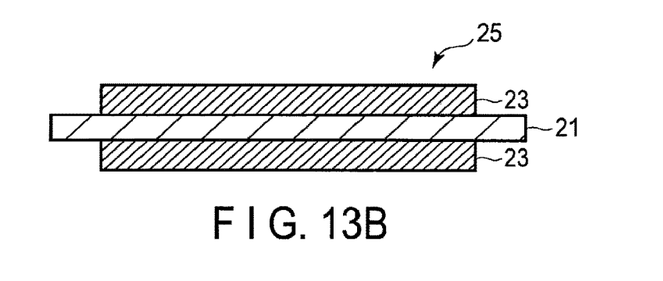
FIG. 13B is a longitudinal sectional view schematically showing a structure of the other bipolar electrode used in the comparative Example 1, in which negative-pole active material layers are formed on both side surfaces of a current collector.

As shown in FIG. 13A, positive-pole active material layers 22 were formed on both side surfaces of a current collector 21. In addition, as shown in FIG. 13B, negative-pole active material layers 23 were formed on both side surfaces of the current collector 21. Thus, a first electrode 24 and a second electrode 25 both according to Comparative Example 1 were obtained.

Comparative Example 2

Figure 13C:
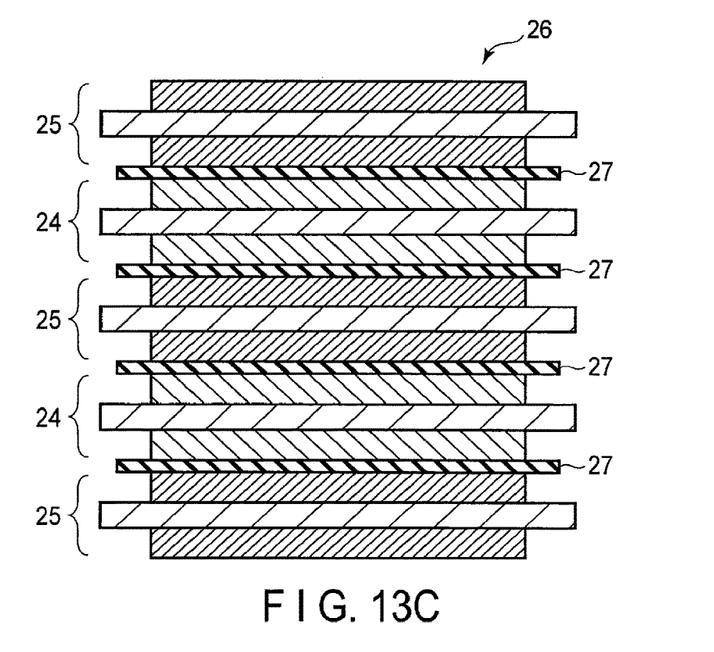
FIG. 13C is a longitudinal sectional view schematically showing a structure of a laminated type battery according to the comparative Example 1.

In FIG. 13C, the first electrodes 24 and the second electrodes 25 both described in Comparative Example 1 were alternately laminated in five layers with electrolyte layers 27 existing between the electrodes to prevent the electrodes from coming into contact with each other. Thus, a laminated type battery 26 according to Comparative Example 2 was obtained.

Next, a charge/discharge test under a constant current was conducted in the Example 2 and the comparative Example 2. Average operating voltages were calculated from results of the tests. Table 1 show values obtained through the calculations.

TABLE 1

|  | Average operating voltage (V) |
|---|---|
| Example 2 | 12.5 |
| Comparative Example 2 | 2.5 |

As shown in Table 1, when the laminated-electrodes body 6 of the bipolar electrode is used as Example 2, an operating voltage in the laminated bipolar battery is higher than that of the laminated battery 26 of the comparative Example 2.

According to these embodiments, it is possible to provide a bipolar battery which is capable of achieving a high energy density and a low resistance, the bipolar battery including a positive-pole active material layer formed on one side surface of a current collector and a negative-pole active material formed on the other side surface of the current collector, a method of manufacturing the same and a battery pack.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A non-aqueous electrolyte battery comprising:
a bipolar electrode including a current collector, a positive-pole active material layer formed on one side surface of the current collector, and a negative-pole active material layer formed on the other side surface of the current collector; and
a non-aqueous electrolyte, wherein
the bipolar electrode is divided into a plurality of parts each having a predetermined length in one direction, and is sequentially and alternately bent between the plurality of parts in opposite directions to produce bent portions so that the plurality of parts are overlapped with each other,
a position of a center of one bent portion is shifted by a predetermined constant distance, in a direction perpendicular to an overlapped direction in which the plurality of parts are overlapped with each other, from a position of a center of another bent portion neighboring the one bent portion in the overlapped direction, and
positions of centers of bent portions alternatively positioned in the overlapped direction are identical to each other in the direction perpendicular to the overlapped direction.

2. The non-aqueous electrolyte battery according to claim 1, wherein a reaction potential of the negative-pole active material layer is 1.5 V.

3. The non-aqueous electrolyte battery according to claim 1, wherein the current collector comprises aluminum.

4. The non-aqueous electrolyte battery according to claim 2, wherein the positive-pole active material layer is able to occlude and discharge lithium.

5. The non-aqueous electrolyte battery according to claim 1, wherein a current collection tab is attached to each bent portion.

6. A battery pack comprising:
non-aqueous electrolyte batteries; and
an outer member configured to store the non-aqueous electrolyte batteries, wherein
each non-aqueous electrolyte battery includes
a bipolar electrode including a current collector, a positive-pole active material layer formed on one side surface of the current collector, and a negative-pole active material layer formed on the other side surface of the current collector, and
a non-aqueous electrolyte, and
the bipolar electrode is divided into a plurality of parts each having a predetermined length in one direction, and is sequentially and alternately bent between the plurality of parts in opposite directions to produce bent portions so that the plurality of parts are overlapped with each other,
a position of a center of one bent portion is shifted by a predetermined constant distance, in a direction perpendicular to an overlapped direction in which the plurality of parts are overlapped with each other, from a position of a center of another bent portion neighboring the one bent portion in the overlapped direction, and
positions of centers of bent portions alternatively positioned in the overlapped direction are identical to each other in the direction perpendicular to the overlapped direction.

7. The battery pack according to claim 6, wherein a reaction potential of the negative-pole active material layer is 1.5 V.

8. The battery pack according to claim 6, wherein the current collector comprises aluminum.

9. The battery pack according to claim 7, wherein the positive-pole active material layer is able to occlude and discharge lithium.

10. The battery pack according to claim 6, wherein a current collection tab is attached to each bent portion.

11. The non-aqueous electrolyte battery according to claim 1, further comprising a plurality of bipolar electrodes, each being the bipolar electrode, wherein
the plurality of bipolar electrodes are laminated on each other and provide a laminated body including the plurality of bipolar electrodes laminated on each other,
the laminated body is divided into a plurality of parts each having a predetermined length in one direction, and is sequentially and alternately bent between the plurality of parts in opposite directions to produce bent portions so that the plurality of parts are overlapped with each other,
a position of a center of one bent portion of the laminated body is shifted by a predetermined constant distance, in a direction perpendicular to an overlapped direction in which the plurality of parts of the laminated body are overlapped with each other, from a position of a center of another bent portion of the laminated body neighboring the one bent portion in the overlapped direction, and positions of centers of bent portions of the laminated body alternatively positioned in the overlapped direction are identical to each other in the direction perpendicular to the overlapped direction.

12. The non-aqueous electrolyte battery according to claim 11, wherein a current collection tab is attached to each bent portion.

13. The non-aqueous electrolyte battery according to claim 1, wherein the negative-pole active material layer includes a metal composite oxide containing titanium.

14. The battery pack according to claim 6, further comprising a plurality of bipolar electrodes, each being the bipolar electrode, wherein the plurality of bipolar electrodes are laminated on each other and provide a laminated body including the plurality of bipolar electrodes laminated on each other, the laminated body is divided into a plurality of parts each having a predetermined length in one direction, and is sequentially and alternately bent between the plurality of parts in opposite directions to produce bent portions so that the plurality of parts are overlapped with each other, a position of a center of one bent portion of the laminated body is shifted by a predetermined constant distance, in a direction perpendicular to an overlapped direction in which the plurality of parts of the laminated body are overlapped with each other, from a position of a center of another bent portion of the laminated body neighboring the one bent portion in the overlapped direction, and positions of centers of bent portions of the laminated body alternatively positioned in the overlapped direction are identical to each other in the direction perpendicular to the overlapped direction.

15. The battery pack according to claim 14, wherein a current collection tab is attached to each bent portion.

16. The battery pack according to claim 6, wherein the negative-pole active material layer includes a metal composite oxide containing titanium.

* * * * *